Feb. 15, 1966  D. H. SANDERS  3,234,915
METHOD AND APPARATUS FOR SHIPPING LIVE BIRDS
Filed March 23, 1964  3 Sheets-Sheet 1
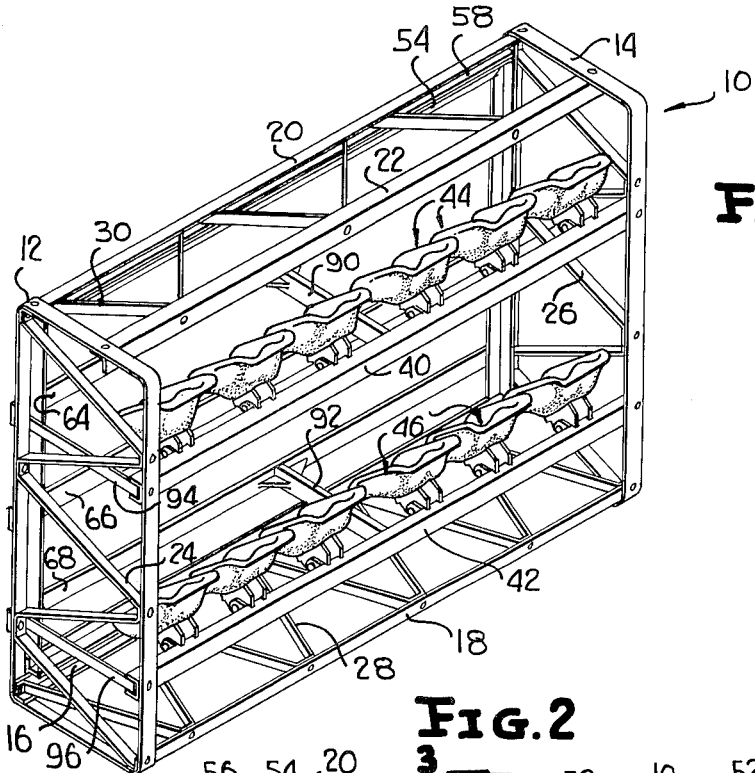
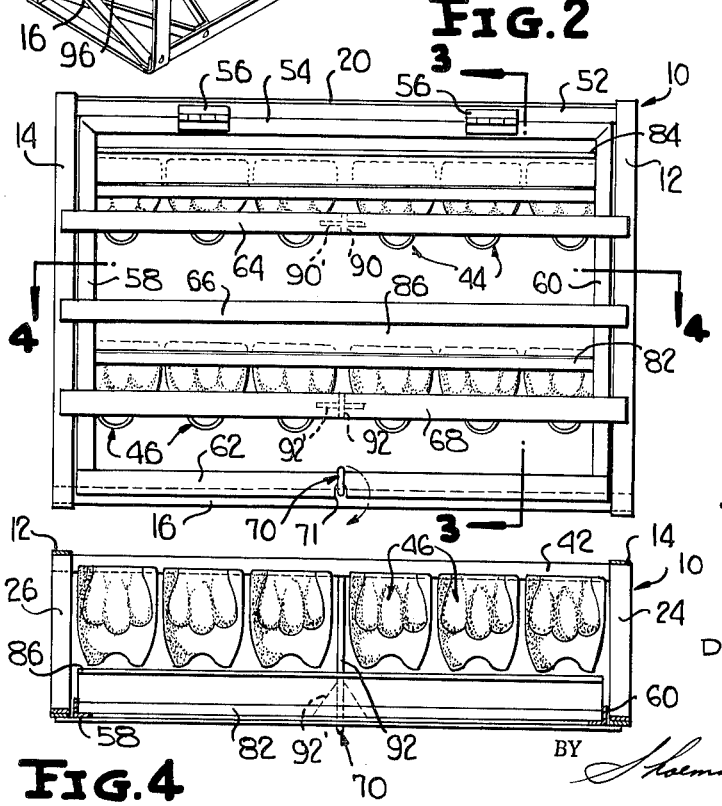
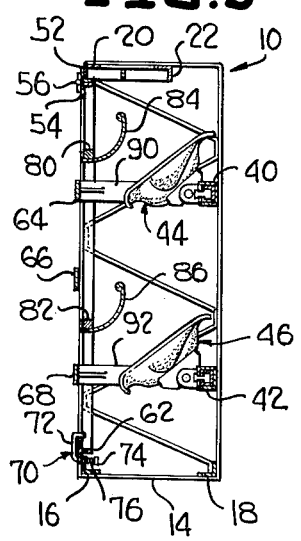
INVENTOR
DICKERSON H. SANDERS
BY *Shoemaker and Mattare*
ATTORNEYS Feb. 15, 1966 D. H. SANDERS 3,234,915
METHOD AND APPARATUS FOR SHIPPING LIVE BIRDS
Filed March 23, 1964 3 Sheets-Sheet 2

INVENTOR
DICKERSON H. SANDERS
BY *Shoemaker and Mattare*
ATTORNEYS

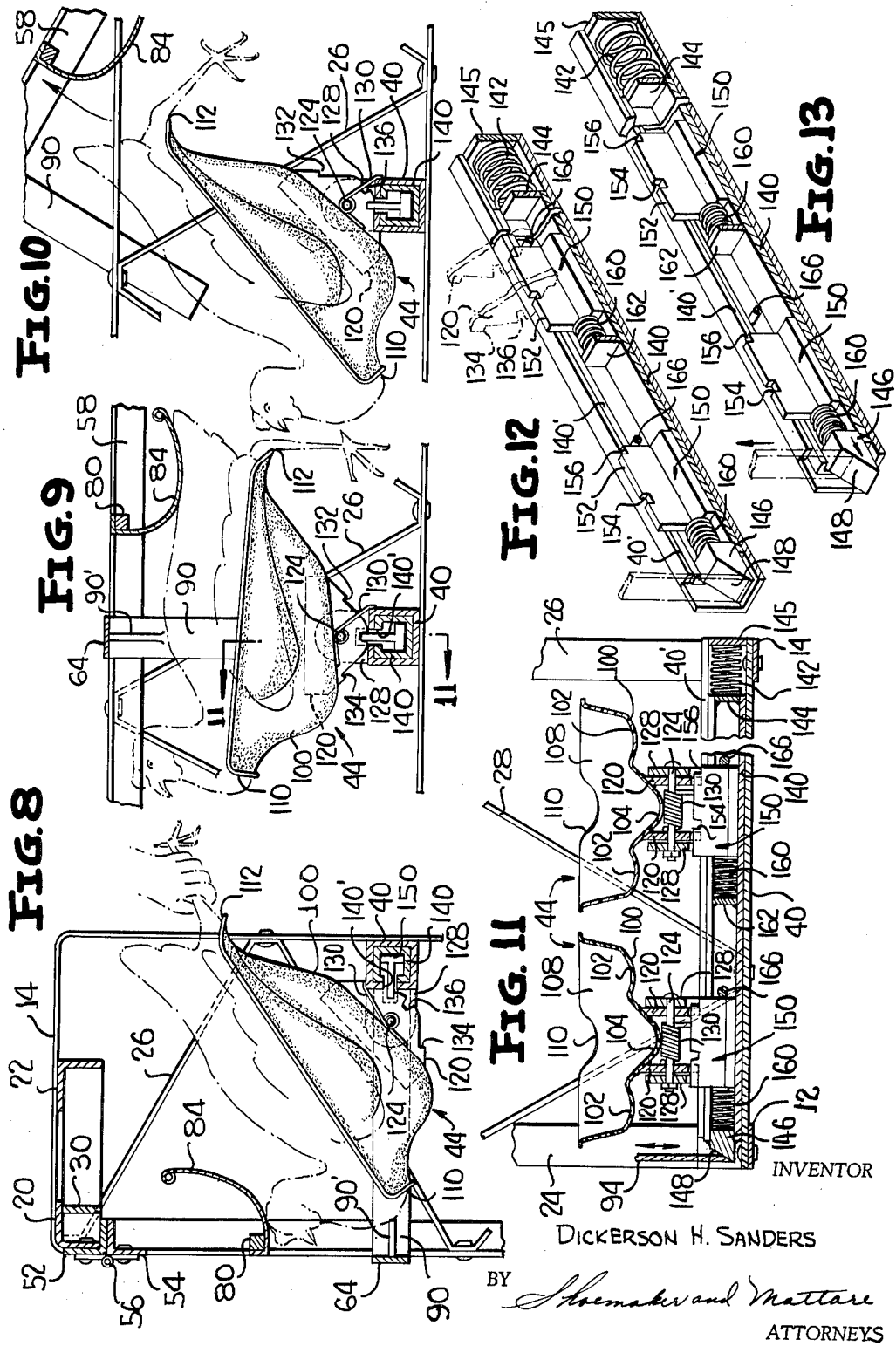

United States Patent Office 3,234,915
Patented Feb. 15, 1966

3,234,915
METHOD AND APPARATUS FOR SHIPPING LIVE BIRDS
Dickerson H. Sanders, 12 Morris Drive, Apt. 204, Laurel, Md.
Filed Mar. 23, 1964, Ser. No. 353,890
14 Claims. (Cl. 119—97)

The present invention relates to a new and novel method and apparatus for shipping live birds, and more particularly to an arrangement for shipping birds such as chickens from the field to a processing plant or the like.

When shipping birds to a processing plant, a major consideration is the prevention of bruising and damaging of the meat of the birds, such as chickens, since such damage to the meat results in a lower grade of meat which of course reduces the value of the meat as sold at retail prices.

While the present invention may of course be utilized with any type of bird or poultry, it is especially adapted for use in shipping chickens. It has been found as a matter of statistical fact that approximately 10 percent of the chickens shipped to processing plants are physically bruised and damaged during transport. In the prior art, the chickens are generally disposed within wooden coops which are of such a size as to receive a number of chickens all of which are unrestrained and free to move about within the coop.

This prior art arrangement has not proved to be satisfactory in actual use since there is nothing to retain the chickens in the desired spaced relationship within the coop, and the chickens are free to slide about within the coop. These coops are generally conveyed by means of trucks, and when these trucks are negotiating corners, the birds usually are thrown into one corner of the coop causing all of the weight of the various birds to be thrown against a bird which is jammed into the corner thereby frequently causing damage to this latter mentioned bird.

It is accordingly a particular purpose of the present invention to provide a new and novel method and apparatus for shipping live birds wherein these disadvantages as found in prior art arrangements are eliminated. The present invention provides an arrangement wherein the birds are supported during shipment in such a manner as to minimize any physical damage to the birds. This is accomplished by supporting the birds on individual support means in spaced relationship to one another and in such a position as to cause the birds to be substantially immobile while being shipped.

In this connection, advantage is taken of the well known fact that a chicken, for example if held in a position such that it is sloping downwardly with its head below horizontal and with its clavicle resting against some sort of support means will instinctively pull its feet up under it and will remain virtually motionless as long as there is any movement whatsoever of the enclosure within which the bird may be positioned or of the truck on which the enclosure is supported.

The support means of the present invention additionally engages a major large area of the underside of the chicken so as to prevent any localized contact therewith, and the support means is additionally contoured so as to be substantially complementary to the shape of the underside of the bird, thereby preventing any excessive rubbing or irritation of any particular part of the bird. These support means also operate in conjunction with other portions of the enclosure means to positively prevent the birds from leaving the support means while in transit.

The loading and unloading of the coops within which birds are normally transported is a rather inefficient and time consuming operation, and it is a further particular feature of the present invention to provide an arrangement which facilitates loading as well as unloading of the apparatus. The loading and unloading can be carried out in such a manner as to minimize any possible physical damage to the birds while conducting such operations. As is well known in the art, it is a common occurrence for the birds to be damaged by personnel who may be forced to treat the birds rather roughly in order to properly insert them or remove them from the coops. Additionally, with the arrangement of the present invention the amount of time and effort required by personnel for loading and unloading is substantially reduced. This may well result in a reduction of the number of personnel required to carry out these operations, and certainly in any event the over-all cost of loading and unloading the apparatus will be reduced.

The structure of the present invention is so arranged that it automatically holds the birds in the desired operative position during all phases of the shipping operations. In other words, the birds are initially held in the desired position with the body sloping downwardly and the head in a downward position, and the birds are retained in this desirable position during normal shipment of the apparatus. Furthermore, when it is desired to unload the apparatus, the birds will be automatically moved into a position wherein they are even tilted to a greater angle such that the feet of the birds will be elevated to enable ready grasping thereof by personnel designed to lift the birds out of the apparatus.

The structure of the present invention is designed to be as lightweight and simple and inexpensive in construction as possible, and yet at the same time it must be quite rugged and sturdy since these type of enclosures are generally submitted to rather rough use and abuse during shipping operations and further it is necessary that the enclosures support the weight of a man since the enclosures are generally stacked one upon another on top of a truck.

An object of the present invention is to provide new and novel apparatus for shipping live birds which supports the birds during shipping in such a manner as to minimize any physical damage thereto.

Another object of the invention is the provision of apparatus for shipping live birds which is so arranged as to facilitate loading as well as unloading of the apparatus thereby reducing the chance of physically damaging the birds and further minimizing the time and effort required to perform these operations.

Still another object of the invention is to provide apparatus for shipping live birds which automatically holds the birds in the desired position during all phases of the shipping operations.

A still further object of the invention is the provision of apparatus for shipping live birds which is relatively lightweight, simple and inexpensive in construction, and yet which is quite rugged and sturdy and efficient and reliable in operation.

Yet another object of the invention is to provide a new and novel method for shipping live birds which affords a simple and novel mode of loading and unloading as well as transporting the birds to minimize physical damage to the birds and the time and effort required by personnel carrying out the operations.

Other objects and many attendant advantages of the invention will become more apparent when considered in connection with the specification and accompanying drawings, wherein:

FIG. 1 is a top perspective view illustrating the enclosure means resting on one of its side portions and with the bottom portion thereof exposed toward the viewer illustrating the side from which the enclosure means is loaded;

FIG. 2 is a top view of the enclosure means of the present invention;

FIG. 3 is a sectional view taken substantially along line 3—3 of FIG. 2 looking in the direction of the arrows;

FIG. 4 is a sectional view taken substantially along line 4—4 of FIG. 2 looking in the direction of the arrows;

FIG. 8 is a sectional view taken substantially along line 8—8 of FIG. 5 looking in the direction of the arrows;

FIG. 9 is a sectional view taken substantially along line 9—9 of FIG. 6 looking in the direction of the arrows;

FIG. 10 is a sectional view taken substantially along line 10—10 of FIG. 7 looking in the direction of the arrows;

FIG. 11 is a sectional view partly broken away and taken substantially along line 11—11 of FIG. 9 looking in the direction of the arrows;

FIG. 12 is a top perspective view partly broken away of the locking mechanism of the apparatus; and FIG. 13 is a view similar to that shown in FIG. 12 and illustrating the locking mechanism in a different operative position.

Figure 5:
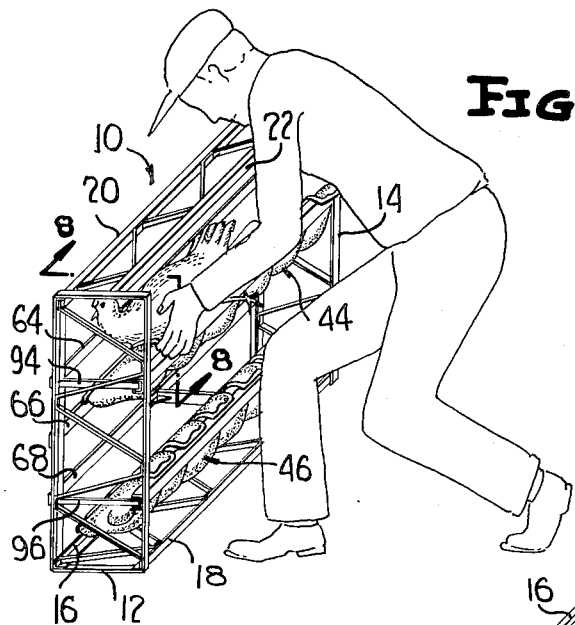
FIG. 5 is a view illustrating the enclosure means in a position similar to that shown in FIG. 1 and illustrating a chicken being loaded into place within the enclosure means.

Referring now to the drawings wherein like reference characters designate corresponding parts throughout the several views, the enclosure means is indicated generally by reference numeral 10 and includes a pair of opposite end members 12 and 14 which may be substantially continuous and of generally rectangular shape with rounded corners. It should be understood at this time that the various frame members as illustrated herein as comprising the different components of the enclosure means may be formed of any suitable lightweight yet strong substance such as plastic, aluminum or any similar substance. It will be assumed simply for the purpose of illustration that the various components are constructed of aluminum and that the various members are suitably joined to one another either by means of rivets or welding as is well understood.

The two end members 12 and 14 are joined by a pair of upper and lower front cross members 16 and 18 respectively defining a front wall portion, and a pair of spaced rear wall members 20 and 22 are also connected between the opposite ends of members 12 and 14. It will be noted that member 18 extends between the corners of members 12 and 14 respectively, while member 22 is spaced along an intermediate portion of one end portion of each of members 12 and 14. The reason for this spacing is to provide access to the support means within the enclosure as will appear more clearly hereinafter.

In order to rigidify and strengthen the structure, first brace means 24 is provided within member 12 and may comprise either an integral piece of material bent into the configuration as shown, or it may comprise a plurality of separate members. In any event, this brace means provides a truss like construction which substantially increases the strength of the end portion 12. In a similar manner, brace means 26 is provided in association with the end member 14. A similar base means 28 is provided between the cross members 16 and 18 and a further brace means 30 is disposed between members 20 and 22 to provide rigid forward and rear wall portions as well as rigid opposite end wall portions.

As seen particularly in FIG. 1, a pair of spaced rails or cross members 40 and 42 extend between the lower portions of the end members 12 and 14 and are rigidly secured to these end members at opposite ends of the rail members. Member 40 serves to pivotally support a plurality of support means indicated generally by reference numerals 44 and described in more detail hereinafter. In a similar manner, rail member 42 serves to pivotally support a plurality of support means indicated generally by reference numeral 46. As illustrated, six support means are shown mounted on each of the rails. Accordingly, the capacity of this particular illustrated modification is twelve birds. It will be readily apparent to one skilled in the art that any number of support means can be provided as desired.

Figure 7:
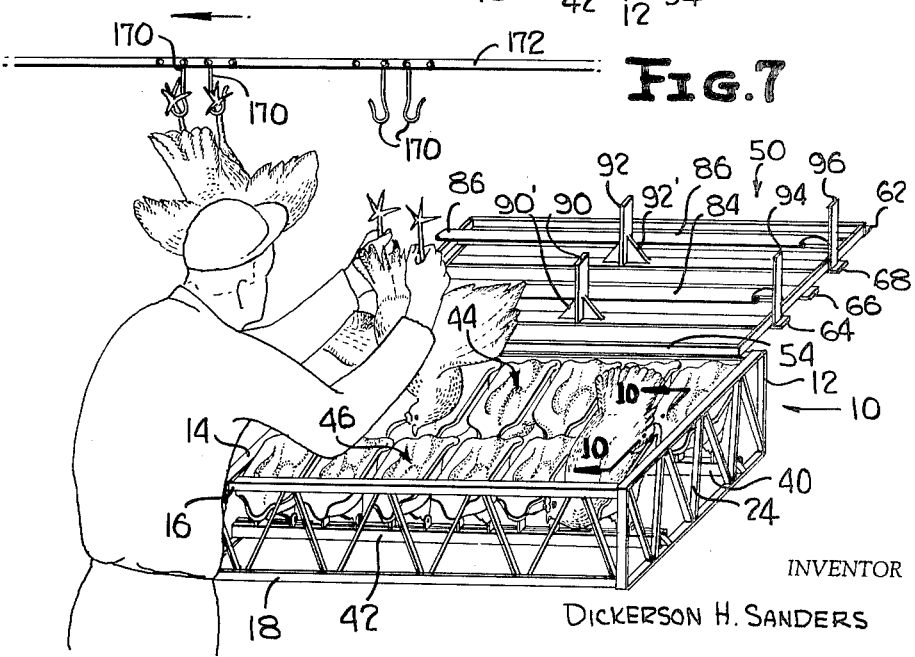
FIG. 7 is a top perspective view with the upper top closure means pivoted into the open position and illustrating the manner in which a man is adapted to raise a bird from the apparatus and place the feet of the bird on shackles of a conveyor line.

As seen particularly in FIG. 7, a top closure means is indicated generally by reference numeral 50, and as seen in this figure, it is in its open position. The over-all arrangement of this top closure can be most clearly understood from an inspection of FIGS. 2 and 3 wherein it may be observed that a first angle member 52 is secured to the previously described angle member 20. An angle member 54 is in turn pivotally interconnected with angle member 52 by means of a pair of spaced hinges 56. A pair of members 58 and 60 have one ends thereof fixed to member 54, and the opposite ends of members 58 and 60 are joined by a forward cross member 62. Each of members 58 and 60 may be angle members, while member 62 may for example be T-shaped in cross sectional configuration and rest upon member 16 when in closed position. Three spaced cross members 64, 66 and 68 are secured between the opposite side members 58 and 60 of the top closure, and the opposite ends of members 64, 66 and 68 may project laterally beyond members 58 and 60 so as to rest upon end members 12 and 14 in the closed position as seen most clearly in FIG. 2. A hook member indicated generally by reference numeral 70 includes a first substantially U-shaped portion which is adapted to fit through a cutout 71 formed in one flange of member 62 and thence lie over the top of member 72 and extend downwardly adjacent the outer edge of the opposite flange of member 62. The shank portion 74 of hook member 70 extends through a hole provided in the upper flange of angle member 16, and a compression spring 76 is mounted about the shank portion 74 and abuts against an enlarged head portion at the end thereof. It is apparent that the spring member 76 will normally urge the hook member downwardly so as to urge it into its locking position as shown in FIG. 3. When it is desired to unlock the top closure, it is merely necessary to lift the hook member upwardly and swing it in the direction of the arrow shown in FIG. 2 so as to release the top closure.

As seen most clearly in FIGS. 2 and 3, a pair of cross members 80 and 82 extend between the side members 58 and 60 of the top closure. A pair of flexible retaining members 84 and 86 are supported by cross members 80 and 82 respectively. These flexible retainer members may be formed of any suitable flexible material such as a thin gauge metal or the like which is rolled at the end as illustrated so as to prevent any sharp edges. The purpose of these retaining members will be explained hereinafter.

Fixedly secured to the central under portion of cross member 64 of the top closure is a downwardly extending brace member 90 having small gusset plates 90′ secured to opposite sides thereof to reinforce the brace member. A similar brace member 92 extends downwardly from the central under portion of cross member 68 of the top closure and gusset plates 92′ are provided for reinforcing this brace member. The brace members 90 and 92 respectively are adapted to rest on the upper surface of the rail members 40 and 42 so as to provide an additional brace for the central portion of the top closure such that it is adapted to support the weight of a man thereon as discussed previously.

A pair of depending operating members 94 and 96 extend downwardly from the outwardly extending end portions of members 64 and 68 respectively, these operating members serving to automatically actuate the locking mechanism hereinafter described.

Referring now particularly to FIGS. 8 through 11, the support means of the present invention may be more clearly understood. The support means 44 is described in detail, it being understood that each of the support means 46 is also identical in configuration, and accordingly a description of one of the support means in conjunction with its associated locking mechanism will suffice for each pair of rail members 40 and 44 which support identical mechanisms.

The support means each include a unitary body potion 100 formed of a suitable material such as polyethylene plastic or the like which is non-irritating to a bird. This support means is molded so as to have a particular configuration in accordance with the bird which it is desired to support. In the illustrated example, a chicken is shown in phantom line, and as seen particularly in FIG. 11, it will be noted that the body means 100 is provided with a pair of depressions 102 at opposite sides thereof for receiving the upper portion of the legs of the chicken, while a central depression 104 is provided for receiving the keel bone or breast area of the chicken.

A forward wall 108 is provided against which the clavicle of the chicken is adapted to rest, and a cutout rolled over portion 110 is adapted to support the neck of the chicken and to allow the neck to extend forwardly as shown. The rear edge 112 is shaped so as to allow the feet to dangle downwardly therefrom as illustrated.

It will be noted that this support means covers a very substantial major portion of the area of the underside of the bird, and further it is contoured so as to more or less snugly receive the bird without pinching or creating any irritation to the bird.

A pair of spaced ears 120 are secured to the underside of the body means 100 and depend therefrom. These ears are provided with a pair of aligned holes which receive a pin 124 which is in turn supported by a pair of upstanding members 128 spaced from one another and supported on the upper surface of rail member 40. It will be noted that this arrangement serves to pivotally support each of the support means for pivotal movement with respect to the associated rail member.

A spring member 130 has the central portion thereof wrapped around each of pins 124, one end of the spring member engaging the support body means 100, and the opposite end of the spring means engaging the associated rail member. The purpose of these spring members is to normally pivot the ears into the position shown in FIG. 8, or in other words, spring members 130 normally urge the support means into the loading position as illustrated specifically in FIG. 8, as well as FIGS. 1 and 5.

As seen particularly in FIGS. 8 through 10 inclusive, each of the ears 120 is provided with a first stop surface 132 which is adapted to engage the associated rail member as shown in FIG. 8 to limit the pivotal movement of the ears and the interconnected support means under the influence of spring 130. Each of these ears also includes a second stop surface 134 which as seen in FIG. 10 limits the movement of the support means in a direction opposed to the normal influence of springs 130 and wherein the support means move toward the unloading position under the influence of the bird within the support means as will be more fully described hereinafter.

Each of the ears also includes a central latching slot 136 which is adapted to receive slidable latching members for locking the support means in the operative transport position as shown in FIG. 9 of the drawings.

The locking mechanism for locking the support means in the operative transport position as shown in FIG. 9 includes a member 140 which is substantially complementary to the rail member 40 and which is slidably disposed therewithin. It will be noted that rail member 40 as well as the complementary member 140 are provided with slots 40' and 140' respectively at the upper portions thereof for receiving the latch members hereinafter described.

As seen particularly in FIG. 11, member 140 is of less length than the rail member 40 within which it is slidably disposed, and the compression spring 142 is inserted between the end wall 144 of means 140 and the end wall 145 of rail member 40. It is apparent that spring 142 normally urges member 140 toward the left as seen in FIG. 11.

The opposite end wall 146 of member 140 is provided with an outwardly facing tapered cam surface 148 which is adapted to be engaged by a correspondingly sloping lower surface on the associated operating member 94. It is apparent that when the top closure is moved into its closed position, member 94 will move downwardly and engage the tapered cam surface 148 thereby urging member 140 to the right as seen in FIG. 11 against the force of spring 142. The purpose of this particular mode of operation will appear hereinafter.

A plurality of spaced latch members 150 are slidably positioned within member 140, and each of these latch members may be substantially T-shaped in cross sectional configuration. The upper edges 152 of each of these latch members is provided with a first notch 154 and a second cutout notch 156. These two notches 154 and 156 are adapted to receive the ear portions and to allow the ears to pivot with respect to the latch members during certain phases of the shipping operation. The mode of operation of these latch members will be described hereinafter.

A plurality of compression springs 160 are provided within member 140, each of these compression springs bearing against one end of the latch members 150 to normally urge the latch members to the right as seen in FIGS. 11 through 13 inclusive. These compression springs may abut at their opposite ends against the end member 146 or against intermediate wall portions 162. The latch members 150 are limited in their movement to the right as seen in these figures by means of cross stop pins 162 secured to the inner facing walls of member 140.

*Operation*

The operation of the apparatus and the method of the present invention will be described hereinafter.

The apparatus is initially placed upon its forward side portion as illustrated in FIGS. 1, 5 and 8 of the drawings. In this position, the apparatus is adapted to be loaded and is normally empty. The support means will be urged into the position illustrated in FIG. 8 wherein they are so oriented that a bird may be readily lowered into the position illustrated in phantom lines in FIG. 8. A man is illustrated as loading a bird into operative position in FIG. 5 of the drawings.

Figure 6:
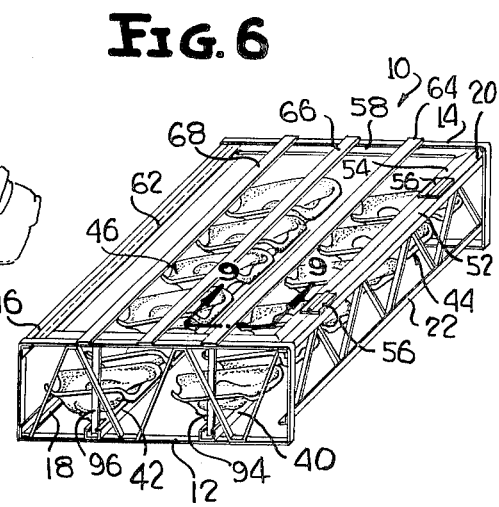
FIG. 6 is a top perspective view of the enclosure means resting upon its bottom portion.

After all of the birds have been inserted into the operative loaded position as described above, the enclosure means of the present invention is then moved into its transport position on the bottom portion thereof, such transport position being illustrated in FIGS. 6 and 9 for example. It will be noted that after the bird is loaded into the support means, the weight of the bird will cause the support means to tilt forwardly so as to overcome the force of spring 130 and to align the latching notch 136 of the ears thereof with one of the latch members 150.

It should be noted that the top closure is first closed before the loading operation is attempted. The opearating members 94 and 96 will accordingly move downwardly and cam the associated slide members 140 to the right as seen in FIG. 11 so as to compress the springs 160 as well as spring 142. Compression of springs 160 normally urges the latch members 150 to the right. At this time, the slots 154 and 156 receive the ears and accordingly the ears are free to pivot.

When the latching slot 136 is aligned with the upwardly extending flange portion of the latch members, springs 160 will cause the latch members to move to the right against the stop pins 166 thereby causing the upper edges 152 of the latch members to move into the latching slots and to positively lock the ears and the associated support means in the operative transport position as illustrated in FIGS. 9 and 11.

It should be noted that when the bird is supported within the support means as seen in FIG. 9 for transport, the resilient retainer member 84 as well as the other retainer member 86 is adapated to engage the upper rear portion of the bird to prevent the bird from backing out of the support means. It will also be noted that in the operative support position of the bird during transport, the enclosure means is normally disposed substantially horizontally so that the bird is actually inclined downwardly with the head in a downward position and with pressure against the clavicle of the bird.

In inserting the bird initially within the support means, the bird will draw his legs up under him automatically when the clavicle portion engages the forward wall 108 of the associated support means, and accordingly the bird will be supported in the position shown in FIG. 9.

In the position shown in FIG. 9, with the head downwardly as compared to a horizontal position, the bird due to its nature will remain substantially immobile and motionless which is of course a very desirable feature since it eliminates the possibility of the bird damaging itself due to unnecessary movements during transport.

When it is desired to unload the birds from the apparatus, the enclosure means is moved into a suitable position and the top closure is raised as illustrated in FIG. 7 and 10. As the top closure is raised, the weight of the bird will tend to cause the support means to pivot downwardly into the position shown in FIG. 10. This pivotal movement is now permitted since the operating members 94 and 96 move upwardly with the top closure thereby permitting the compression spring 142 to urge the slidable member 140 to the left and causing the stop pins 166 to urge the latch members 150 to the left to a position wherein the slots 154 and 156 thereof are aligned with the ears 120 thereby allowing the ears and the associated support means to pivot into the position shown in FIG. 10. This pivotal movement is limited by engagement of shoulder 134 with the associated rail member.

As shown in FIG. 12, the slidable member 140 is shown in its limit of movement to the right wherein the springs 160 are placed under compression and urge the latch members 150 toward the right. In the position shown in FIG. 13, slidable member 140 is illustrated in its limit of movement toward the left and wherein the latch members have been moved into position to allow free pivotal movement of the ears under the influence of the weight of the bird or when the bird is removed under the influence of springs 130.

Referring now to FIG. 10 wherein the apparatus is shown in its unloading position, it will be observed that the head of the bird has moved even lower while the feet have been swung even further upwardly. This positions the feet such that they can be readily grasped by personnel, and as illustrated in FIG. 7, a man is shown as lifting a bird out of the apparatus by its feet.

It is then of course a simple matter for the man to attach the feet of the bird to shackles 170 extending downwardly from an overhead conveyor 172 of conventional construction.

After the enclosure has been completely unloaded, the top closure 50 is again moved to its closed position and the enclosure means is ready for reloading at a subsequent time.

It is apparent from the foregoing that there is provided according to the present invention new and novel apparatus for shipping live birds which supports the birds during shipping in such a manner as to minimize any possible physical damage thereto by maintaining the birds in such a position that they are substantially immobile and by retaining them within a support means which prevents any movement and bumping of the birds and further which supports a relatively large area to prevent any local irritations to various parts of the birds. The arrangement of the present invention facilitates loading as well as unloading thereby substantially reducing the possibility of physically damaging the birds and also minimizing the time and effort required by personnel to carry out these operations. The structure is such that the support means which holds the birds automatically moves into desired position during all phases of the shipping operations including the loading, the transporting and the unloading of the apparatus. The over-all construction provides a lightweight, simple and inexpensive structure, yet one which is quite rugged and sturdy and further which is efficient and reliable in operation.

The method of the present invention may be carried out by relatively inexperienced personnel and it further affords a simple and novel mode of loading and unloading as well as transporting the birds which substantially decreases the losses normally attendant with this type of operation.

As this invention may be embodied in several forms without departing from the spirit or essential characteristics thereof, the present embodiment is therefore illustrative and not restrictive, and since the scope of the invention is defined by the appended claims, all changes that fall within the metes and bountds of the claims or that form their functional as well as conjointly cooperative equivalents are therefore intended to be embraced by those claims.

I claim:

1. Apparatus for shipping live birds comprising a lightweight enclosure means for receiving a plurality of birds, a plurality of support means disposed within said enclosure means and supported thereby, each of said support means defining a relatively large area and being contoured to receive the major portion of a live bird and to support the bird in an immobile position to prevent physical damage thereto during shipping operations, each of said support means being pivotally supported by said enclosure means and being automatically movable into different operative positions relative to said enclosure means during different phases of the shipping operation, means for moving said support means into operative position, means for holding the support means in operative position, and means for limiting movement of said support means, said last-mentioned means comprising interengaging surfaces formed on a portion of said support means and a portion of said enclosure means.

2. Apparatus as defined in claim 1 wherein said means for retaining the support means in operative position comprises latching means slidably mounted with respect to said enclosure means and movable into and out of locking engagement with a portion of said support means.

3. Apparatus as defined in claim 2 wherein said slidable latching means is normally resiliently urged in one direction, and including operating means for moving the latching means in the opposite direction, a closure means pivotally supported on said enclosure means, said operating means being connected with and movable with said closure means for moving said slidable latching means in said opposite direction.

4. Apparatus for shipping live birds comprising a lightweight enclosure means including an open framework, a plurality of support means movably supported within said enclosure means for movement into different positions relative to said enclosure means during different phases of a shipping operation, said support means being of a relatively large area and being contoured so as to receive and support the major underportion of a bird so as to hold the bird immobile during shipment and to prevent damage to the birds, means normally resiliently urging said support means in one direction, stop means formed on a portion of said support means and said enclosure means for limiting movement of said support means with respect to said enclosure means, means for locking said support means in a particular operative position, said locking means being movably mounted with respect to said enclosure means, resilient means normally urging said locking means in one direction, a closure means pivotally interconnected with said enclosure means and adapted to close off a portion thereof, said closure means including operating means connected therewith and movable therewith and engageable with a portion of said locking means for moving said locking means in a direction opposite to that in which the locking means is normally urged, said locking means including a plurality of latching members slidably mounted with respect to said locking means and resilient means normally urging said latching members in a particular direction, said support means including portions engageable with said latching members for holding the support means in a particular position.

5. Apparatus as defined in claim 4 wherein said closure means includes flexible retaining means extending inwardly of said enclosure means for retaining live birds in operative position within said support means.

6. Apparatus as defined in claim 4 including brace members connected with said closure means and engageable with a portion of said enclosure means when the closure means is in closed position so as to brace the closure means and enable it to support a substantial amount of weight thereupon.

7. Apparatus for shipping live birds comprising an enclosure means including an open lightweight framework defining four side portions, a top portion and a bottom portion, said bottom portion including a plurality of spaced members, a plurality of support means pivotally supported upon each of said spaced members and defining a relatively large contoured area for receiving a major portion of the undersurface of a live bird for supporting a bird in an immobile position within the enclosure means and for preventing physical damage to the bird, spring means normally urging each of said support means in one direction with respect to said enclosure means, said support means being automatically movable into different operative positions during different phases of a shipping operation, limit stop means formed on said support means and said enclosure means for limiting movement of said support means with respect to said enclosure means, each of said support means having latching slot means formed therein, locking mechanism for retaining said support means in a particular operative position, said locking mechanism including a first movable means slidably mounted on said enclosure means, spring means normally urging said first movable means in one direction, said first movable means having stop means formed thereon, a plurality of latch members slidably mounted on said first movable means, spring means mounted between each of said latch members and a portion of said first movable means for normally urging said latch members in one direction, each of said latch members having slot means formed in a portion thereof for receiving a portion of an associated support means, said latch members being movable into the slot means formed in said support means for holding the support means in a particular operative position, said enclosure means including a pivoted top portion, said pivoted top portion being swingable between an open and a closed position, means for locking said top portion in its closed position, a pair of spaced flexible retaining members mounted on said top portion and extending inwardly of said enclosure means for retaining live birds in said support means, said top portion having mounted thereon brace members adapted to engage a portion of said enclosure means and to brace the top portion for supporting a substantial amount of weight thereon, said top portion also including spaced operating means movable therewith and adapted to engage a portion of said first movable means of the locking mechanism for moving said first movable means in a direction opposite to that in which it is normally urged.

8. Apparatus for shipping live birds comprising a lightweight framework, bird support means supported by said framework, said support means being adapted to receive a live bird, said support means defining a relatively large area contoured so as to be substantially complementary to the underpart of a live bird to relatively snugly receive and support a major portion of the underpart of the live bird without pinching or irritating the bird, means for automatically positioning said support means when the framework is in normal horizontal operative shipping position and when a bird is supported by the support means such that a bird supported by the support means is held in a position sloping downwardly with its head below its normal position so as to hold the bird substantially immobile during shipment.

9. Apparatus for shipping live birds comprising a lightweight framework, bird support means supported by said framework, said support means being adapted to receive a live bird, said support means defining a relatively large area for receiving and supporting a major portion of the underpart of a live bird, means for automatically positioning said support means when the framework is in normal horizontal operative shipping position and when a bird is supported by the support means such that a bird supported by the support means is held in a position sloping downwardly with its head below its normal position so as to hold the bird substantially immobile during shipment, and retaining means supported adjacent said support means when in normal operative shipping position for retaining live birds in place within said support means.

10. Apparatus for shipping live birds comprising a lightweight framework, bird support means supported by said framework, said support means being adapted to receive a live bird, said support means defining a relatively large area for receiving and supporting a major portion of the underpart of a live bird, said support means being contoured so as to provide an open and unobstructed rear portion allowing the feet of the bird to dangle downwardly, means for automatically positioning said support means when the framework is in normal horizontal operative shipping position and when a bird is supported by the support means such that a bird supported by the support means is held in a position sloping downwardly with its head below its normal position so as to hold the bird substantially immobile during shipment.

11. Apparatus as defined in claim 10 and including retaining means supported adjacent said support means when in normal horizontal operative shipping position for retaining live birds in place within said support means.

12. Apparatus as defined in claim 11 wherein said support means is so contoured as to be substantially complementary to the underpart of a live bird to relatively snugly receive and support the bird without pinching or irritating the bird.

13. The method of shipping live birds comprising providing a lightweight framework with support means therein, manually grasping a live bird and placing the live bird in said support means with the legs of the bird drawn up thereunder and with the underpart of the bird supported by the support means with the feet of the bird dangling downwardly from a rear portion of the support means and with the body of the bird sloping downwardly so that the head of the bird is below its normal position so as to maintain the bird substantially immobile during shipment, maintaining and restraining the bird in this position on the support means during the shipping operation to positively prevent escape of the bird therefrom, releasing the bird from said restraining position, then manually grasping the feet of the bird and lifting the bird upwardly away from the support means and the framework.

14. The method as defined in claim 13 including the further step prior to grasping the feet of the bird and lifting the bird upwardly away from the support means of first moving the bird into an unloading position with the head further downwardly from the normal operative shipping position and with the legs upwardly of the head.

References Cited by the Examiner
UNITED STATES PATENTS

| | | | |
|---|---|---|---|
| 478,930 | 7/1892 | Ewert | 119—19 |
| 2,122,731 | 7/1938 | Summers | 119—97 |
| 2,564,630 | 8/1951 | Thorman | 17—44.1 |
| 2,611,338 | 9/1952 | Yellin | 119—17 |
| 2,616,558 | 11/1952 | Kay | 206—45.13 |
| 2,674,226 | 4/1954 | Manning | 119—48 |
| 3,011,477 | 12/1961 | Bressler et al. | 119—48 |
| 3,164,129 | 1/1965 | Rigterink | 119—45 |

SAMUEL KOREN, *Primary Examiner.*

ALDRICH F. MEDBERY, *Examiner.*